United States Patent
Jiang et al.

(10) Patent No.: US 11,408,646 B2
(45) Date of Patent: Aug. 9, 2022

(54) LADDER-STRUCTURAL GRAVITY-ASSISTED-HEAT-PIPE GEOTHERMAL ENERGY RECOVERY SYSTEM WITHOUT LIQUID-ACCUMULATION EFFECT

(71) Applicant: GUANGZHOU INSTITUTE OF ENERGY CONVERSION, CHINESE ACADEMY OF SCIENCES, Guangzhou (CN)

(72) Inventors: Fangming Jiang, Guangzhou (CN); Wenbo Huang, Guangzhou (CN); Wenjiong Cao, Guangzhou (CN); Yiwei Wang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 170 days.

(21) Appl. No.: 16/960,328

(22) PCT Filed: Jun. 25, 2019

(86) PCT No.: PCT/CN2019/092660
§ 371 (c)(1),
(2) Date: Jul. 7, 2020

(87) PCT Pub. No.: WO2020/140406
PCT Pub. Date: Jul. 9, 2020

(65) Prior Publication Data
US 2021/0254862 A1 Aug. 19, 2021

(30) Foreign Application Priority Data
Apr. 23, 2019 (CN) .......................... 201910328413.5

(51) Int. Cl.
*F24T 10/40* (2018.01)
*F28D 15/02* (2006.01)
(Continued)

(52) U.S. Cl.
CPC .......... *F24T 10/40* (2018.05); *F28D 15/0266* (2013.01); *F28D 15/04* (2013.01); *F24T 2010/56* (2018.05); *F28D 2015/0216* (2013.01)

(58) Field of Classification Search
CPC ... F24T 10/40; F24T 2010/56; F28D 15/0266; F28D 15/04; F28D 2015/0216;
(Continued)

(56) References Cited

U.S. PATENT DOCUMENTS

| 3,884,293 A * | 5/1975 | Pessolano | F01M 11/12 33/721 |
| 2015/0013370 A1 * | 1/2015 | Wiggs | F25B 27/00 62/260 |

(Continued)

FOREIGN PATENT DOCUMENTS

| CN | 101696829 A | 4/2010 |
| CN | 205090847 U | 3/2016 |

(Continued)

OTHER PUBLICATIONS

Written Opinion of the International Searching Authority; english translation (Year: 2019).*

(Continued)

*Primary Examiner* — Gordon A Jones
(74) *Attorney, Agent, or Firm* — Bayramoglu Law Offices LLC

(57) ABSTRACT

A ladder-structural gravity-assisted-heat-pipe geothermal energy recovery system without liquid-accumulation effect, comprises a ladder-structural gravity-assisted heat pipe, a condenser, and a liquid tank. The ladder-structural gravity- (Continued)

assisted heat pipe comprises a return pipe, an outer pipe and an inner pipe. The return pipe is provided in a space between the outer pipe and the inner pipe and communicated with the liquid tank, and the space between the outer pipe and the inner pipe is divided to form a ladder structure. A liquid working medium flows from the liquid tank through the return pipe into each section sequentially, absorbs heat from a high-temperature rock through a wall of the outer pipe, vaporizes into a gaseous working medium, gets into the inner pipe, and rises to the condenser to condense and flows to the liquid tank to circulate. Such design greatly improves the heat transfer efficiency in geothermal energy recovery using ultra-long heat pipes.

14 Claims, 2 Drawing Sheets

(51) Int. Cl.
*F28D 15/04* (2006.01)
*F24T 10/00* (2018.01)

(58) Field of Classification Search
CPC ........ F28D 15/02; F28D 15/00; F28D 15/043; F28D 15/046; F28D 15/06; F28D 15/0275; F28D 15/0283; H01L 23/00; H01L 23/427; H05K 7/00; H05K 7/20336
See application file for complete search history.

(56) References Cited

U.S. PATENT DOCUMENTS

| | | | | |
|---|---|---|---|---|
| 2015/0021924 A1* | 1/2015 | Parella, Sr. | .......... | H02K 7/1807 |
| | | | | 165/45 |
| 2015/0292774 A1* | 10/2015 | Kang | ...................... | F24T 10/30 |
| | | | | 165/45 |
| 2015/0300327 A1* | 10/2015 | Sweatman | .............. | E21B 43/25 |
| | | | | 60/641.2 |
| 2018/0320897 A1* | 11/2018 | Carney | ................. | F28D 7/1615 |
| 2020/0025419 A1* | 1/2020 | Sakai | ...................... | F24T 10/20 |
| 2021/0396430 A1* | 12/2021 | Cook | .................... | E21B 43/267 |

FOREIGN PATENT DOCUMENTS

| | | |
|---|---|---|
| CN | 107144035 A | 9/2017 |
| CN | 108344317 A | 7/2018 |
| CN | 109029033 A | 12/2018 |
| SU | 1553817 A1 | 3/1990 |
| WO | WO-2022022750 A1 * | 2/2022 |

OTHER PUBLICATIONS

Long Zhang et al., The Heat Analysis and Improving Measures of a Over-long Gravity Heat Pipe's Extrecting Gravity Heat Pipe's Extracting Geothermal Technology, 2016, pp. 1-59.

* cited by examiner

LADDER-STRUCTURAL GRAVITY-ASSISTED-HEAT-PIPE GEOTHERMAL ENERGY RECOVERY SYSTEM WITHOUT LIQUID-ACCUMULATION EFFECT

CROSS REFERENCE TO THE RELATED APPLICATIONS

This application is the national phase entry of International Application No. PCT/CN2019/092660, filed on Jun. 25, 2019, which is based upon and claims priority to Chinese Patent Application No. 201910328413.5, filed on Apr. 23, 2019, the entire contents of which are incorporated herein by reference.

TECHNICAL FIELD

The present invention relates to the technical field of geothermal energy recovery, and particularly relates to a ladder-structural gravity-assisted-heat-pipe geothermal energy recovery system without liquid-accumulation effect.

BACKGROUND

With the reduction of fossil fuel reserves and the environmental problems caused by fossil fuel exploitation and utilization, new energy resources which are renewable and non-polluting have attracted much attention. Compared with the other renewable energy resources, geothermal energy is stable and reliable, and is free from the influence of weather, seasons, climates, and daily variations, making it more suitable as a basic energy resource for heating and power systems. At present, the exploitation and utilization of geothermal resources not only include direct utilization in heating and planting, but also allow geothermal cooling and power generation from medium or high temperature geothermal resources. In addition, the exploitation of geothermal resources has also been extended from shallow hydrothermal resources to deep geothermal resources such as hot dry rock resources.

A heat pipe effectively transfers heat from a high-temperature end to a low-temperature end by phase transition of a working medium in the pipe. Heat pipes exhibit high thermal conductivity and excellent isothermal property, and thus are one of the most effective heat transfer equipments at present. Compared with conventional geothermal systems, using heat pipes to extract the heat energy in hot dry rocks does not require additional pumping work; and also, because the heat transfer working medium only circulates in the pipe, it is possible to effectively avoid loss of the working medium, pipeline fouling and environmental pollution.

Currently, traditional gravity-assisted heat pipes have been successfully applied in exploitation and utilization of shallow geothermal resources, such as snow melting, frozen soil stabilization, agricultural greenhouse heating, and pond heating. However, with the exploitation of geothermal resources being extended to deeper strata, the technical bottleneck of existing geothermal heat pipes has been exposed. For existing gravity-assisted heat pipes used in geothermal energy recovery, in order to ensure the heated section to be completely wetted, a liquid column formed at the heated section of the heat pipe is required. Under the action of gravity, the working medium at deeper liquid level will exhibit a higher pressure and thereby a higher saturation temperature. At a liquid level depth larger than a certain value, the saturation temperature of liquid working medium will be higher than the temperature outside the tube, such that the liquid working medium will be unable to vaporize, resulting in greatly reduced heat transfer efficiency of the heat pipe.

SUMMARY

The present invention provides a ladder-structural gravity-assisted-heat-pipe geothermal energy recovery system without liquid-accumulation effect, which realizes effective exploitation of deep geothermal resources.

The present invention adopts the following technical solutions.

A ladder-structural gravity-assisted-heat-pipe geothermal energy recovery system without liquid-accumulation effect, comprises a gravity-assisted heat pipe 1, a condenser 2, and a liquid tank 3, wherein the gravity-assisted heat pipe 1 is disposed underground and the condenser 2 and the liquid tank 3 are disposed aboveground.

The gravity-assisted heat pipe 1 comprises an outer pipe 8 and an inner pipe 9, a space between the outer pipe 8 and the inner pipe 9 is divided to form a ladder structure; the structure is characterized in that, a plurality of division plates 10 and a plurality of liquid-level control tubes 11 are provided in the space between the outer pipe 8 and the inner pipe 9, wherein the plurality of division plates 10 are sequentially arranged in a vertical direction where the gravity-assisted heat pipe 1 contacts a high-temperature rock 6 and configured to divide the space between the outer pipe 8 and the inner pipe 9 into a plurality of sections, each two adjacent sections being communicated via one of the liquid-level control tubes 11, and the topmost section being communicated with a return pipe 7; the liquid-level control tubes 11 are hollow pipes fixed in the division plates, wherein when a liquid level in one of the sections is higher than the tube, a liquid working medium flows to a lower section through the tube, so as to maintain the liquid level in each section below a certain level.

The liquid working medium flows from the liquid tank 3 through the return pipe 7 into each of the sections of the space between the outer pipe 8 and the inner pipe 9 sequentially, absorbs heat from the high-temperature rock 6 through a wall of the outer pipe 8, and vaporizes into a gaseous working medium; the gaseous working medium gets into the inner pipe 9 and rises to the condenser 2; the condenser 2 exchanges heat with environment to condense the gaseous working medium into the liquid working medium which is then transferred to the liquid tank 3; the liquid working medium in the liquid tank 3 flows through the return pipe 7 into the gravity-assisted heat pipe 1 again to circulate.

Furthermore, wicks 12 with a certain length are provided on an inner surface of the outer pipe 8 at an area below each division plate 10, bottoms of the wicks 12 being immersed in the liquid working medium in order to ensure the inner surface of the outer pipe 8 to be completely wetted above the liquid levels.

Furthermore, a plurality of gas holes 13 are provided on a surface of the inner pipe 9 at an area between a top of each liquid-level control tube 11 and the division plate 10 above the liquid-level control tube, wherein after the liquid working medium absorbs heat and vaporizes into the gaseous working medium, the gaseous working medium gets into the inner pipe 9 through the gas holes 13 and rises to the condenser 2.

Furthermore, openings are provided at a bottom of the inner pipe 9, wherein the liquid working medium in the bottommost section of the space between the outer pipe 8 and the inner pipe 9 flows into the inner pipe 9 through the openings; an upper level detector 14 and a lower level detector 15 are provided on an inner wall at the bottom of the inner pipe 9, wherein the upper level detector 14 is disposed below the gas holes 13 of the bottommost section, and the lower level detector 15 is disposed above the openings at the bottom of the inner pipe 9.

Furthermore, a throttling valve 5 is provided at a junction of the liquid tank 3 and the return pipe 7 where a flow rate of the liquid working medium is regulated by adjusting an openness of the throttling valve 5.

Compared with existing geothermal energy recovery systems, the present invention has the following advantages:

(1) The present invention introduces a heat pipe to realize spontaneous exploitation of geothermal energy from hot dry rock resources through phase transition of the working medium in the heat pipe, while auxiliary power is not required for maintaining system operation. During the system operation, the heat-transferring working medium is sealed and circulated in the pipe without contacting the rock, and thus it is possible to avoid loss of the working medium, pipeline fouling and environmental pollution.

(2) In the present invention, the heated section of the heat pipe is divided to form a ladder structure, wherein the liquid level in each section is limited below a certain level via a liquid-level control tube. Such design allows the heated section to be completely wetted while avoids the problem that the working medium is unable to vaporize due to excessively high liquid level, and thereby greatly improves the heat transfer efficiency in geothermal energy recovery using ultra-long heat pipes.

(3) The present invention further comprises a valve for controlling the flow rate of returning working medium, and level detectors at the bottom of the heat pipe. In practical application, the flow rate of returning working fluid may be regulated according to the level detectors. Such design is more practical and ensures that there will be no liquid accumulation or dry burning occurring inside the heat pipe.

Figure 1:
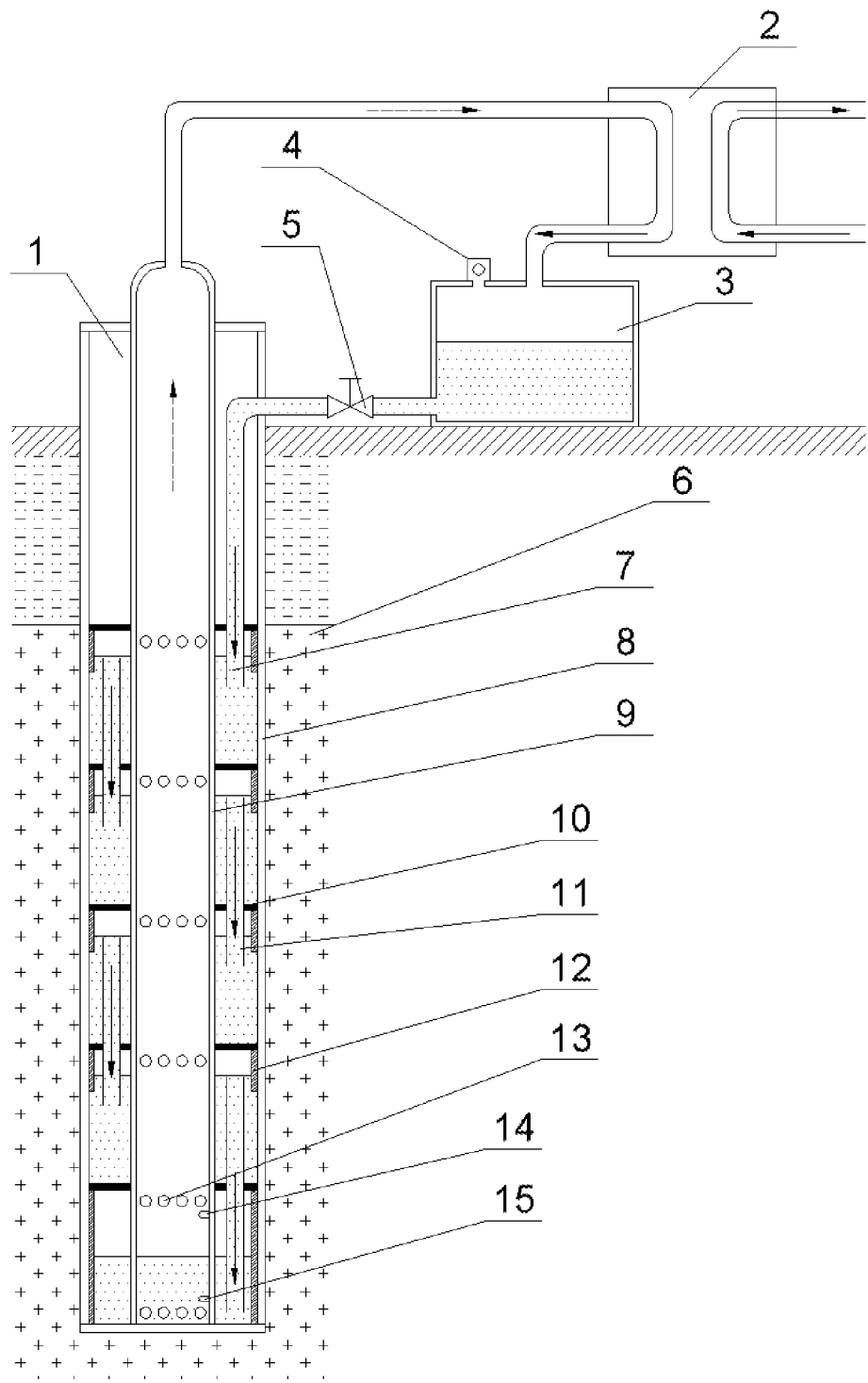
FIG. 1 is a schematic diagram showing the structure of a ladder-structural gravity-assisted-heat-pipe geothermal energy recovery system without liquid-accumulation effect in one embodiment.

Reference signs: 1. ladder-structural gravity-assisted heat pipe; 2. condenser; 3. liquid tank; 4. exhaust/injection valve; 5. throttling valve; 6. high-temperature rock; 7. return pipe; 8. outer pipe; 9. inner pipe; 10. division plate; 11. liquid-level control tube; 12. wick; 13. gas hole; 14. upper level detector; 15. lower level detector.

DETAILED DESCRIPTION OF THE EMBODIMENTS

The present invention will be described in detail below with reference to the drawings and specific embodiment.

In the present embodiment, the ladder-structural gravity-assisted-heat-pipe geothermal energy recovery system without liquid-accumulation effect comprises a ladder-structural gravity-assisted heat pipe 1, a condenser 2, and a liquid tank 3. The ladder-structural gravity-assisted heat pipe 1 comprises a return pipe 7, an outer pipe 8 and an inner pipe 9. The return pipe 7 is provided in a space between the outer pipe 8 and the inner pipe 9 and communicated with the liquid tank 3. A vapor outlet at the top of the inner pipe 9 is communicated with the condenser 2. The condenser 2 exchanges heat with environment, while its condensate outlet is communicated with the liquid tank 3. The liquid working medium in the liquid tank 3 flows through the return pipe 7 into the gravity-assisted heat pipe 1 again to circulate.

Figure 2:
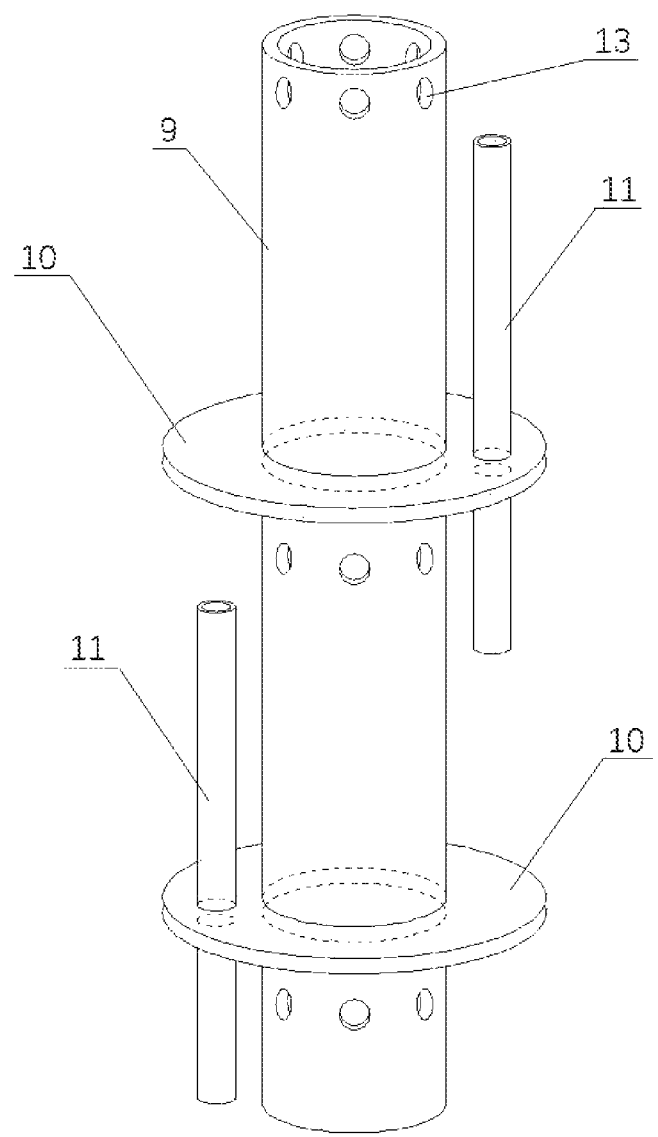
FIG. 2 is a schematic diagram showing an assembly of the inner pipe, the liquid-level control tubes, and the division plates.

Division plates 10, liquid-level control tubes 11, and wicks 12 are provided in the space between the outer pipe 8 and the inner pipe 9. The division plates 10 are arranged at equal intervals in the area where the lower part of the heat pipe contacts a high-temperature rock 6 and configured to divide the space between the outer pipe 8 and the inner pipe 9 into a plurality of sections. The topmost section is communicated with the return pipe 7, while each two adjacent sections are communicated via one liquid-level control tube 11. A plurality of gas holes 13 are provided on a surface of the inner pipe 9 at an area between a top of each liquid-level control tube 11 and the division plate 10 above the liquid-level control tube. The arrangement of the inner pipe 9, the division plates 10, the liquid-level control tubes 11, and the gas holes 13, is illustrated by FIG. 2.

The wicks 12 having a certain length are provided on an inner surface of the outer pipe 8 at an area below each division plate 10, and bottoms of the wicks 12 are immersed in the liquid working medium.

Openings are provided at a bottom of the inner pipe 9, while an upper level detector 14 and a lower level detector 15 are provided on an inner wall at the bottom of the inner pipe 9. The upper level detector 14 is disposed below the gas holes of the bottommost section, and the lower level detector 15 is disposed above the openings at the bottom of the inner pipe.

The liquid tank 3 comprises an exhaust/injection valve 4 for discharging non-condensable gas in the liquid tank and pouring a liquid working medium into the liquid tank 3. A throttling valve 5 is provided at a junction of the liquid tank 3 and the return pipe 7.

An implementation procedure of this embodiment:

(1) Detecting the high-temperature rock target through geological survey, and drilling a bore well from the ground towards the high-temperature rock 6.

(2) Placing the outer pipe 8 in the bore well, and injecting slurry between the outer pipe 8 and the borehole for well cementing and filling the space between the outer pipe 8 and the rock.

(3) Determining the maximum acceptable liquid-accumulation height of the working medium by calculation or experiments, based on the downhole temperature measurement data and the designed heat recovery rate.

(4) At intervals of the maximum acceptable liquid-accumulation height of the working medium, welding the division plates 10 to the wall of the inner pipe 9 and making the gas holes 13; welding the liquid-level control tubes 11 to the division plates; making the openings at the bottom of the inner pipe 9, and disposing the upper level detector 14 and the lower level detector 15.

(5) Placing the processed inner pipe 9 and the return pipe 7 into the outer pipe 8, arranging the wicks 12 in the outer pipe 8, then sealing the top of the outer pipe 8, and sequentially connecting the top of the inner pipe 9, the condenser 2, the liquid tank 3, and the return pipe 7.

(6) Vacuumizing the system via the exhaust/injection valve 4, then switching off the throttling valve 5, and pouring a sufficient amount of the liquid working medium into the liquid tank 3.

(7) Opening the throttling valve 5 gradually to startup the system. Appropriately increasing the openness of the throttling valve 5 when the lower level detector 15 does not detect liquid, and appropriately reducing the openness of the throttling valve 5 when the upper liquid level detector 14 detects liquid, so that the liquid level in the inner pipe may be maintained between the two level detectors. Such design may avoid dry burning or liquid accumulation inside the heat pipe during the operation.

(8) During the operation, the liquid working medium flows from the liquid tank 3 through the return pipe 7 into the topmost section; when the level in this section is high than the liquid-level control tube 11, the liquid working medium will spontaneously flows to the lower section. The liquid working medium in each section will absorb heat from the high-temperature rock 6 through the outer pipe 8, and vaporizes into a gaseous working medium, which then gets into the inner pipe 9 through the gas holes 13, rises to the condenser 2 where it condenses and releases heat, and eventually returns to the liquid tank 3.

In order to ensure the sealing between each division plate 10 and the outer pipe 8, a groove may be formed along the rim of the division plate 10 for placing an O-ring.

The wicks 12 are attached to the inner surface of the outer pipe 8, and the bottom of each wick 12 should be immersed in the liquid working medium in order to ensure an area of the inner surface of the outer pipe 8 above the liquid level to be completely wetted.

The high-temperature rock includes but not limited to a high-permeability water-bearing rock, a hot dry rock, and an artificial fractured rock constructed by hydraulic excitation.

The working medium includes but not limited to distilled water, ammonia, carbon dioxide, and various organic working medium.

Optionally, an additional exhaust valve may be provided at the top of the outer pipe 8 for vacuumizing the space at the non-heated sections between the outer pipe 8 and the inner pipe 9 so as to maintain the temperature of the gaseous working medium in the inner pipe 9.

The above detailed description is a specific description of possible embodiments of the present invention, which are not intended to limit the scope of the present invention. Any equivalent implementation or modification that does not deviate from the present invention should be included in the scope of the present case.

What is claimed is:

1. A ladder-structural gravity-assisted-heat-pipe geothermal energy recovery system without liquid-accumulation effect, comprising a gravity-assisted heat pipe, a condenser, a liquid tank, and a plurality of gas holes, wherein the gravity-assisted heat pipe is disposed underground and the condenser and the liquid tank are disposed aboveground;
    wherein
    the gravity-assisted heat pipe comprises an outer pipe and an inner pipe, a space between the outer pipe and the inner pipe is divided to form a ladder structure;
    the ladder structure comprises a plurality of division plates and a plurality of liquid-level control tubes, wherein the plurality of division plates and the plurality of liquid-level control tubes are provided in the space between the outer pipe and the inner pipe, wherein the plurality of division plates are sequentially arranged in a vertical direction where the gravity-assisted heat pipe contacts a high-temperature rock and are configured to divide the space between the outer pipe and the inner pipe into a plurality of sections, each two adjacent sections are communicated via one of the liquid-level control tubes, and the topmost section is communicated with a return pipe;
    the liquid-level control tubes are hollow pipes fixed in the division plates, and are configured to allow a liquid working medium to flow to a lower section through the liquid-level control tube when a liquid level in one of the sections is higher than the liquid-level control tube so as to maintain the liquid level in the section below a certain level; and
    the plurality of gas holes are provided on a surface of the inner pipe at an area between a top of each of the liquid-level control tubes and the division plate above the liquid-level control tube.

2. The geothermal energy recovery system according to claim 1, further comprising
    a plurality of wicks, wherein the plurality of wicks with a certain length are provided on an inner surface of the outer pipe at an area below each of the division plates.

3. The geothermal energy recovery system according to claim 1, further comprising
    a plurality of openings, wherein the plurality of openings are provided at a bottom of the inner pipe, and are configured to allow the liquid working medium in the bottommost section of the space between the outer pipe and the inner pipe to flow into the inner pipe through the openings; an upper level detector and a lower level detector are provided on an inner wall at the bottom of the inner pipe, wherein the upper level detector is disposed below the gas holes of the bottommost section, and the lower level detector is disposed above the openings at the bottom of the inner pipe.

4. The geothermal energy recovery system according to claim 3, further comprising
    a throttling valve, wherein the throttling valve is provided at a junction of the liquid tank and the return pipe and configured to regulate a flow rate of the liquid working medium by adjusting an openness of the throttling valve.

5. The geothermal energy recovery system according to claim 4, further comprising
    a groove, wherein the groove is formed along a rim of each division plate for placing an O-ring in order to ensure sealing between the division plate and the outer pipe.

6. The geothermal energy recovery system according to claim 5, further comprising
    an exhaust valve, wherein the exhaust valve is provided at a top of the outer pipe for vacuumizing the space between the outer pipe and the inner pipe at non-heated sections so as to maintain a temperature of a gaseous working medium in the inner pipe.

7. The geothermal energy recovery system according to claim 6,
    wherein the high-temperature rock comprises a high-permeability water-bearing rock, a hot dry rock, and an artificial fractured rock constructed by hydraulic excitation.

8. The geothermal energy recovery system according to claim 7,
    wherein the liquid working medium and the gaseous working medium comprise distilled water, ammonia, carbon dioxide, and organic working medium.

9. The geothermal energy recovery system according to claim 8,
wherein the inner pipe is a plastic pipe with lower thermal conductivity in order to maintain a temperature of vapor in the pipe.

10. A process for recovering geothermal energy using the geothermal energy recovery system of claim 1, comprising adding the liquid working medium into the liquid tank, wherein the liquid working medium flows from the liquid tank through the return pipe into each of the sections of the space between the outer pipe and the inner pipe sequentially, absorbs heat from the high-temperature rock through a wall of the outer pipe, and vaporizes into a gaseous working medium; the gaseous working medium gets into the inner pipe and rises to the condenser; the condenser exchanges heat with environment to condense the gaseous working medium into the liquid working medium which is then transferred to the liquid tank; the liquid working medium in the liquid tank flows through the return pipe into the gravity-assisted heat pipe again to circulate.

11. The process of claim 10, wherein a plurality of wicks with a certain length are provided on an inner surface of the outer pipe at an area below each of the division plates, and bottoms of the wicks are immersed in the liquid working medium in order to ensure the inner surface of the outer pipe to be completely wetted above the liquid level.

12. The process of claim 11, wherein a plurality of gas holes are provided on a surface of the inner pipe at an area between a top of each of the liquid-level control tubes and the division plate above the liquid-level control tube, wherein after the liquid working medium absorbs heat and vaporizes into the gaseous working medium, the gaseous working medium gets into the inner pipe through the gas holes and rises to the condenser.

13. The process of claim 12, wherein a plurality of openings are located at a bottom of the inner pipe, the liquid working medium in the bottommost section of the space between the outer pipe and the inner pipe flows into the inner pipe through the openings; an upper level detector and a lower level detector are located on an inner wall at the bottom of the inner pipe, wherein the upper level detector is disposed below the gas holes of the bottommost section, and the lower level detector is disposed above the openings at the bottom of the inner pipe.

14. The process of claim 13, wherein the liquid working medium and the gaseous working medium comprise distilled water, ammonia, carbon dioxide, and organic working medium.

* * * * *